(No Model.)

F. M. CROMER.
TIRE TIGHTENER.

No. 600,611. Patented Mar. 15, 1898.

WITNESSES:
A. F. Broomhall
Wm H Gilbert

INVENTOR:
Franklin M. Cromer,
BY
Frank M. Burnham.
his ATTORNEY.

UNITED STATES PATENT OFFICE.

FRANKLIN M. CROMER, OF DAYTON, OHIO.

TIRE-TIGHTENER.

SPECIFICATION forming part of Letters Patent No. 600,611, dated March 15, 1898.

Application filed December 13, 1897. Serial No. 661,730. (No model.)

*To all whom it may concern:*

Be it known that I, FRANKLIN M. CROMER, a citizen of the United States, residing at Dayton, in the county of Montgomery and State of Ohio, have invented certain new and useful Improvements in Tire-Tighteners; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in the construction and arrangement of a tightener for securing and tightening the tires of vehicle-wheels, and is a separate and distinct improvement over Letters Patent No. 564,007, granted to me under date of July 14, 1896.

The object of my present invention is to construct a tire-tightener of so simple a form and arrangement and so few parts as to be readily and cheaply manufactured and which will be susceptible of being quickly applied as well to old tires of any ordinary wheels as to new ones.

A further and important object of my present improvement is to so construct a tire-tightener that when the tire is once set it will always act automatically, thus keeping the tire always tight on the felly and preventing the spokes from mashing into the felly or hub, no matter how great may be the degree of expansion or contraction, and never need any further attention during the life of the wheel, which is not the case in most of the present forms of tires and in others is very imperfectly accomplished; and to this end it consists in the construction and combination of parts, as will be hereinafter described, and pointed out in the claims, in accordance with the statute made and provided therefor.

Figure 1:
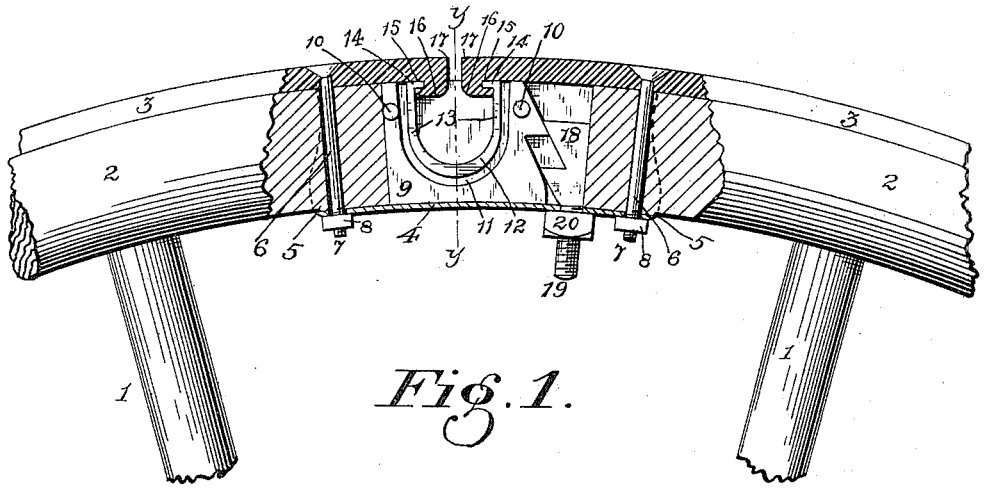
Figure 2:
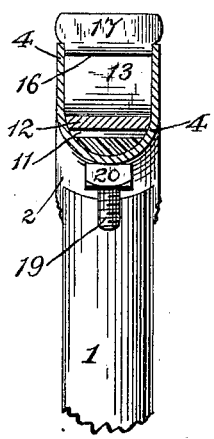
Figure 3:
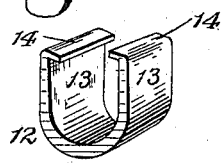
Figure 4:
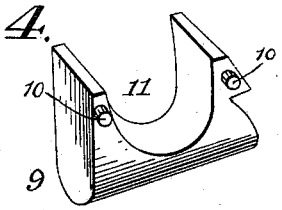

Referring to the accompanying drawings, illustrating my invention, and in which similar numerals of reference indicate like parts in the several views, Figure 1 is a longitudinal sectional view of my automatic tire-tightener. Fig. 2 is a transverse sectional view taken on the line $y\ y$ of Fig. 1. Fig. 3 is a detail view in perspective of the spring; and Fig. 4 is a detail view in perspective of the malleable casting, in which is adjustably located the spring.

The numeral 1 indicates the spokes of an ordinary vehicle-wheel, which radially connect the felly 2 to the hub in the usual manner.

3 is a tire encircling the felly. Located within the felly and adapted to form a part thereof is a casing or clip 4, formed at each end with socket-openings 5, into which the adjacent ends of the felly-sections are adapted to be inserted.

6 represents bolts, each formed with a countersunk head, which rests in a correspondingly-shaped perforation in the tire, through which said bolt passes, and extends in a radial manner through a perforation or slot in the felly near its ends and thence through a perforation in the end of the socket-openings of said clip. These bolts have screw-threaded ends 7 to receive the nuts 8, by which means the ends of the felly and tire will automatically adjust themselves when acted upon, as the bolt-openings and perforations are of sufficient size to allow of the expansion or contraction of the felly. Located within said casing or clips, so as to form a part thereof, and situated midway between its two ends, is placed a malleable casting or box 9, which is preferably provided with short projecting pins or rivets 10, which pass through correspondingly-shaped openings (not necessary to be here shown) in each of the sides of and by which means the casing or clip is securely welded thereto. The space from each end of the malleable casting or box to the ends of the clip helps to form the socket-openings 5. Said malleable casting or box is formed with a chamber or recess 11 of a corresponding shape, but somewhat larger than the curved or bent spring 12, which it protects, but does not touch, so as to allow of the proper adjustment and adaptation of the spring to the expansion and contraction of the felly.

Spring 12 is made of properly-tempered metal of a suitable quality, and I preferably construct it of a "horseshoe" shape, although any other form that will properly act and exert a sufficient and constant amount of tension upon the tire and thus accomplish the desired result may be used. The two ends 13 of spring 12 are bent to form small lips or flanges 14, which have a firm and constant bearing in a similarly-shaped groove 15, located in the elongated or transverse lugs or ribs 16, formed in each of the divided ends 17 of the tire, and as said spring (as above referred to) is of sufficient temper to exert enough tension upon the tire ends it thus keeps said tire constantly tightened upon the felly.

It has been found in practice that it is not necessary that the space left between the tire ends 17 when the tire is set should be over an eighth of an inch, as this space is so small that no stones or pebbles can work or pass through and lodge in the chamber or recess in the spring, and what small amount, if any, of mud which might settle therein could not remain, as it would soon become dry and jar out.

To further provide for tightening of the felly onto the spokes and thus allow of the automatical tightening of the wheel, I provide in one of the end sockets 5 of the clip 4 an adjustable block 18, having a screw-threaded stem 19 with a nut 20 thereon. This block 18 bears at one end against the end of the malleable box 9, which is of similar contour or form to receive it, and at the other end against the end of the felly which is inserted into the socket.

When the tire is first placed on the felly, the bearing-block is at a point as to a radial line nearest to the center of the wheel, and in this position the felly is firmly connected to the spokes. In case the spokes should become loosened the bearing-block 18 is moved to a position as to a radial line farther from the center of the wheel, which will then permit of the felly-sections to be drawn closer together, and at the same time the action of the spring will draw the two ends of the tire closer together.

By automatically tightening the tire through the medium of the tension of the spring the felly will be shrunk so as to take up the slack produced by the adjustment of the bearing-block 18, and the felly, by tightening the tire thereon, may thus be tightened onto the spokes and the wheel tightened up throughout without cutting or changing any of the parts thereof.

I do not limit myself to the exact style or form of any of the several parts of my automatic tire-tightener, as they may be somewhat varied without departing from the spirit of my invention; but

What I claim as new and useful, and as my invention desire to secure by Letters Patent, is—

1. In a device for tightening the tires of wheels by means of their divided ends, a spring so formed that its ends will exert sufficient tension on the ends of the tire so as to tighten said tire automatically, substantially as and for the purposes set forth.

2. In an automatic tire-tightener provided with a clip, a malleable casting located within and provided with means for welding it to said clip; having one end formed as a bearing-surface—adapted for a bearing-block—each end of said malleable casting being of sufficient distance from the adjacent ends of the clip to help in forming socket-openings therein, and provided with a chamber for the reception of any device adapted to grasp the ends of the tire, thus tightening it; substantially as set forth and specified.

3. In a tightener for tightening the tire of a wheel to the felly automatically; the combination with a malleable box having means for welding it in the clip, and an end formed with a bearing-surface—adapted for a bearing-block—and a recess formed therein; of a spring situated therein formed with ends having flanged lips adapted to rest in a groove in a transverse lug on each end of tire; substantially as set forth and specified.

4. In combination with a felly and a tire thereon; of a casing forming a part of said felly and provided with a malleable box; the ends of which in conjunction with the ends of the casing help to form socket-openings to receive the felly ends; slotted perforations in ends of felly, socket ends of clip and in the ends of the tire to receive a bolt and nut for retaining said parts together without binding, a chamber in said malleable box; of a spring situated loosely therein provided with ends adapted to grasp and exert sufficient tension on the ends of the divided tire; of said tire ends formed with a transverse lug with a correspondingly-shaped recess therein to receive the spring ends, substantially as set forth.

5. In a tire-tightener the combination with the divided ends thereof; of a clip provided with a malleable casting the ends of which in conjunction with the ends of the clip help to form socket-openings for the inserted ends of the felly; slotted perforations in ends of felly, socket ends of clip and in the ends of the tire to receive a bolt and nut for retaining said parts together without binding; of a movable bearing-block adapted to move on a radial line to and from the center, a recess in said malleable casting; of a spring resting in said recess formed with ends adapted to grasp and exert sufficient tension on the divided ends of the tire; of said tire ends formed with a transverse lug with a correspondingly-shaped groove to receive the spring ends; substantially as set forth.

In testimony whereof I have affixed my signature in presence of two witnesses.

FRANKLIN M. CROMER.

Witnesses:
 CHARLES J. MCKEE,
 A. S. BYRNE NELLIS.